United States Patent [19]
Brock

[11] Patent Number: 5,273,012
[45] Date of Patent: Dec. 28, 1993

[54] SWASH PLATE ENGINE WITH FIXED TORQUE REACTION MEMBER

[76] Inventor: James E. Brock, P.O. Box 124, Amboy, Wash. 98601

[21] Appl. No.: 993,244

[22] Filed: Dec. 17, 1992

[51] Int. Cl.⁵ .............................................. F02B 75/26
[52] U.S. Cl. ................................... 123/58 B; 123/197.4
[58] Field of Search .......... 123/58 B, 58 BA, 58 BC, 123/58 BB 197.4

[56] References Cited

U.S. PATENT DOCUMENTS

| | | | |
|---|---|---|---|
| 1,315,538 | 9/1919 | Burtnett | 123/58 BC |
| 1,355,484 | 10/1920 | Lleo et al. | 123/58 BC |
| 1,656,884 | 1/1928 | Davol | 123/51 B |
| 1,702,467 | 2/1929 | Davol | 123/58 BC |
| 1,978,194 | 10/1934 | Gray | 123/41.74 |
| 2,087,567 | 7/1937 | Blum | 123/58 BA |
| 2,263,561 | 11/1941 | Biermann | |
| 2,275,775 | 3/1942 | Kunz | |
| 2,475,295 | 7/1949 | Sherman | |
| 2,513,083 | 6/1950 | Eckert | |
| 2,539,880 | 1/1951 | Wildhaber | |
| 3,528,394 | 9/1970 | Cummins | |
| 3,536,050 | 10/1970 | Denis | 123/58 BC |
| 4,152,944 | 5/1979 | Kemper | 123/58 BA |
| 4,258,590 | 3/1981 | Meijer | 123/58 BA |
| 4,294,139 | 10/1981 | Bex et al. | 123/58 B |
| 4,489,682 | 12/1984 | Kenny | 123/58 BC |
| 4,622,927 | 11/1986 | Wenker | 123/58 BC |
| 5,027,755 | 7/1991 | Henry | 123/58 B |
| 5,083,532 | 1/1992 | Wiesen | 123/58 B |

Primary Examiner—Tony M. Argenbright
Assistant Examiner—M. Macy
Attorney, Agent, or Firm—Chernoff, Vilhauer, McClung & Stenzel

[57] ABSTRACT

A swash plate engine having a stationary torque reaction member to resist tangential forces by directly supporting a piston rod is disclosed. To accommodate the stationary torque reaction member the swash plate is provided with a slot which receives the stationary torque reaction member during rotation of the swash plate. The torque reaction member provides reaction forces to the piston rod to maintain a proper orientation for the piston rod as it presses against the swash plate, making a wobble plate unnecessary.

18 Claims, 6 Drawing Sheets

SWASH PLATE ENGINE WITH FIXED TORQUE REACTION MEMBER

BACKGROUND OF THE INVENTION

This invention relates to engines and, more particularly, to engines in which a swash plate is used to convert reciprocal motion of a piston to rotary motion of a drive shaft.

A swash plate engine is an engine in which reciprocal piston motion is converted to rotary shaft motion by means of a swash plate fixedly attached to the shaft at a tilted orientation. Typically, such an engine has several elongate cylinders arranged symmetrically about an elongate drive shaft and the longitudinal axes of the cylinders and the shaft are parallel. In the prior art, each cylinder has a piston and piston rod that move reciprocally and the piston rod has an outer end which extends out from its respective cylinder and connects to a wobble plate which is in slidable contact with the tilted swash plate. When the piston moves longitudinally in the cylinder the piston rod pushes on the wobble plate causing the swash plate to rotate to accommodate the motion of the piston rod. Reaction forces by the swash plate on the piston rod (via the wobble plate) would tend to displace the piston rod away from a central location in the cylinder if the piston rod were not restrained in some way.

Prior art swash plate engines incorporate the wobble plate to control radial and circumferential piston rod displacement in order to maintain a desired predetermined orientation of the rods with respect to their respective cylinders so that the piston rod can transmit force from the piston to the swash plate. The wobble plate is free to move longitudinally of the shaft with the ends of the piston rods but is restrained against rotation about the shaft. The outer end of each piston rod is pivotally attached to the wobble plate. In a swash plate engine the cylinders are usually arranged concentrically about the drive shaft and the pistons reciprocate in a sequential order so that as one piston reaches the top end of its stroke the piston of the diametrically opposed cylinder will be at the bottom of its stroke. Therefore, the wobble plate nutates, without rotation, about the longitudinal axis of the shaft as the pistons move in sequence. As the wobble plate nutates it exerts pressure against the oblique surface of the swash plate causing the swash plate, and the shaft, to rotate. Bearings between the swash plate and wobble plate reduce friction at their interface.

Relevant prior art patents that disclose the use of a wobble plate, or the general equivalent, for converting reciprocal motion to rotary motion include: Lleo et al., U.S. Pat. No. 1,355,484 disclosing a ring piece connected to the piston rods; Davol, U.S. Pat. No 1,656,884 disclosing a "wobbling knuckle"; and Sherman, U.S. Pat. No. 2,475,295 disclosing a wobble plate. All of these prior art patents disclose a means of maintaining piston rod alignment that includes a significant moving mass.

The mass of a wobble plate presents a problem in prior art swash plate engines. Because the wobble plate is pivotally connected to the ends of the piston rods it is therefore a part of the mass that the engine must continuously accelerate, which limits the efficiency of the engine. What is needed, then, is a swash plate engine that maintains piston rod alignment without adding unnecessary moving mass, in order to improve engine efficiency.

SUMMARY OF THE INVENTION

The present invention overcomes the aforementioned disadvantages of the prior art swash plate engines by providing a swash plate apparatus that uses a stationary torque reaction unit to maintain piston rod alignment in the circumferential direction. In one embodiment of the invention the piston rods are in slidable contact with a fixedly located, multipiece torque reaction unit that guides the movement of the piston rods to keep them suitably oriented in the circumferential direction with respect to the cylinders so that the piston rods can transmit the piston force to the swash plate. The piston rods are also slidably connected directly to an annular path that is defined in the swash plate by circumferential surfaces that move past the outer ends of the piston rods as the swash plate and shaft rotate. The torque reaction unit is accommodated by a division in the swash plate defining a deep slot located between radially inner and outer parts of the path. The torque reaction unit supports the outer end of the piston rod against reaction forces of the swash plate against the piston rod.

The circumferential surfaces that define the path preferably comprise two primary bearing runners and two secondary bearing runners. A bearing runner is a surface upon which a bearing rides as the swash plate rotates. The primary bearing surfaces are arranged at an oblique angle to each other and carry the force associated with the outward motion of the piston which is transmitted through the piston rod. The angular relationship of the primary bearing surfaces provides the restraint for the outer ends of the piston rods in the radial direction. The secondary bearing surfaces are arranged to capture the end of the piston rod to prevent it from disengaging from the path of the swash plate.

In a preferred embodiment, the piston rod is connected to the piston with a wrist pin that permits the piston rod to rotate with respect to the piston along only one plane of rotation. It is necessary to keep the plane of rotation aligned with the actual movement of the piston rod, namely, radially with respect to the elongate shaft. Therefore, in one embodiment of the present invention the piston rods have a noncircular cross-section and an anti-twist plate is disposed around each piston rod near an end of each cylinder to prevent the piston rods from rotating and to maintain the plane of rotation of the piston rod relative to the piston radially to the shaft.

It is therefore an object of the present invention to provide an improved swash plate apparatus to convert reciprocating motion to rotary motion.

It is also an object of the present invention to provide a swash plate engine with a fixedly mounted torque reaction unit.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figures 1, 2:
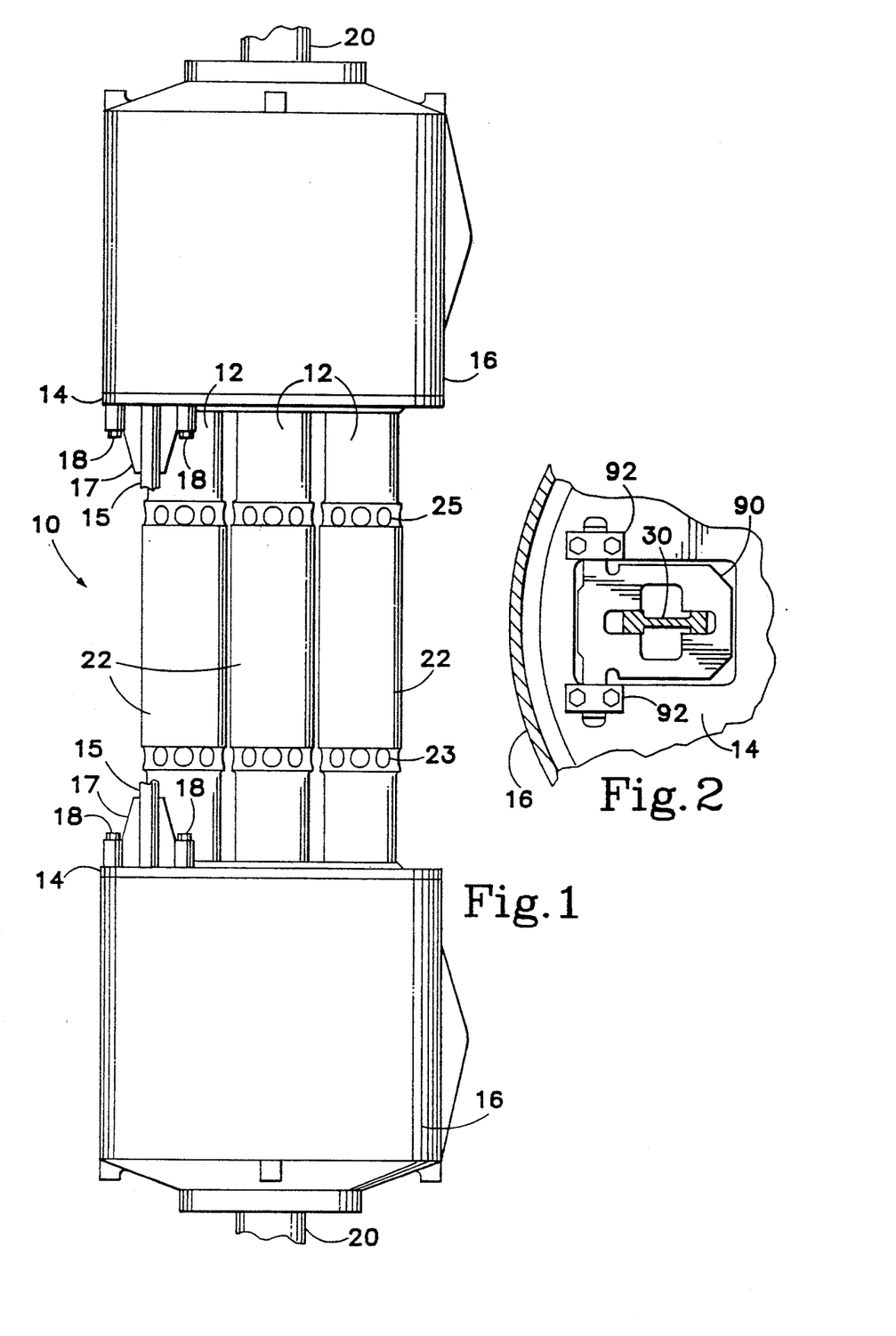
FIG. 1 is an elevational view of a four-cylinder, eight-piston swash plate engine which is a preferred embodiment of the present invention.
FIG. 2 is a plan view of an anti-twist plate attached to a bulkhead forming a part of the preferred embodiment of the present invention. The anti-twist plate is shown disposed around a piston rod shown in cross-section.
Figure 3:
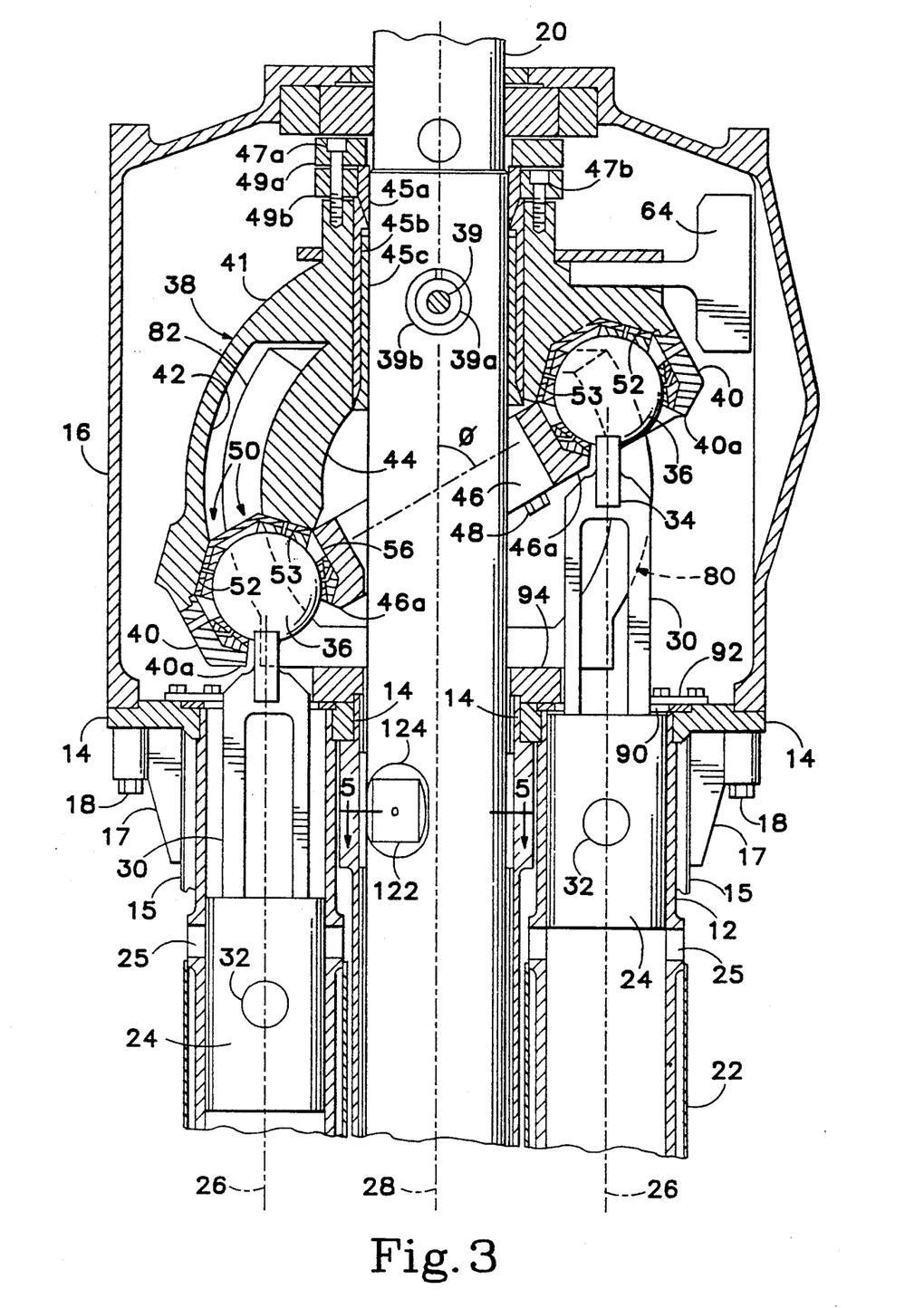
FIG. 3 is a sectional view of one end of the engine shown in FIG. 1, taken in a plane parallel to FIG. 1.

Referring now to the drawings, in FIG. 1 there is shown a swash plate engine 10 representing a preferred embodiment of the present invention. The engine 10 has four cylinders 12 arranged equidistantly and symmetrically about a shaft 20 (the fourth cylinder 12 is behind the three visible cylinders 12). Each cylinder is attached at each end to a respective bulkhead 14. A housing 16 is attached to each bulkhead 14 in a manner to be oil-tight. The bulkheads 14 are structurally connected by tie bars 15 that are fastened to the bulkheads by bolts 18 and strengthened by gussets 17. Only one tie bar 15 and gusset 17 pair are shown. However, the preferred embodiment would have a plurality of tie bars and gussets around the perimeter of the bulkheads. The shaft 20 extends through the centers of the housings 16, bulkheads 14, and between the four cylinders 12 and is supported by bearings allowing it to rotate relative to the housing, bulkhead, and cylinders about its longitudinal axis 28 (FIG. 3). Disposed about each cylinder 12 is a jacket 22 that carries a flow of a cooling fluid past the outside of the cylinders 12 to cool the cylinders during engine operation. Provision is also made for introducing a combustible fluid into the middle of each cylinder 12, and an ignition system is provided for igniting the combustible fluid.

Within each cylinder 12 are a pair of opposed pistons 24 that move reciprocally in opposite directions. Thus, with the introduction of a combustible fluid into the cylinders 12 between the pistons 24 and with subsequent ignition of the fluid, the pistons move away from the center of each cylinder toward the cylinder ends a the bulkheads 14 due to the expansion of the burning fluid. It will be understood that a compressed gas, such as steam, could also be introduced through an appropriate inlet valve (not shown) to expand within the cylinder 12. Exhaust ports 25 are provided to permit an exhaust flow of spent gas from each cylinder 12. Inlet ports 23 are provided to admit air for scavenging as well as for supplying combustion air.

Referring next to FIGS. 3-6 and 10, a swash plate mechanism in a preferred embodiment of the invention is shown within one of the housings 16. Although FIGS. 3-6 and 10 show only one housing and the associated swash plate mechanism it should be understood that the mechanism within the second housing 16 shown in FIG. 1 is essentially identical to the swash plate mechanism in FIGS. 3-6. The swash plates are offset from one another, relative to the shaft 20, by approximately 15 degrees to ensure proper port timing.

As previously described, pistons 24 are disposed within cylinders 12 and move reciprocally along respective piston paths 26 which are parallel to an axis of rotation 28 of the shaft 20 in the preferred embodiment shown, but need not be parallel to accomplish the objectives of the invention. The shaft's axis of rotation 28 is coincident with its longitudinal central axis 28 and the reference numeral 28 will be understood to apply to both.

A piston rod 30 is pivotally attached to each piston 24 by means of a wrist pin 32, which allows the piston rod 30 to pivot about the piston in a plane extending radially outward from the shaft 20. A ball mount 34 fixedly connects a ball 36 to one end of each piston rod 30 by means of bolts (not shown). The ball 36 is spherically shaped except for a slot which fits over the ball mount 34. The piston rod 30 has a noncircular cross-section as can best be seen in FIG. 2.

A swash plate 38, comprising a body 41, an annular flange 40, an inner member 44, and a capture ring 46, is fixedly attached to the shaft 20 by bolt 39 and concentric, split, wedge tubes 45a, 45b, and 45c. Tightening bolt 39 pulls two tapered plugs 39a into either end of a split tube 39b causing the split tube to expand against the shaft 20 and the swash plate body 41. Bolts 47a and 47b tighten rings 49a and 49b, respectively, against the wedge tubes 45a and 45b causing a firm, concentric connection between the swash plate 38 and the shaft 20. The body 41 is roughly in the shape of a hemisphere truncated at an oblique angle $\phi$ relative to the longitudinal axis 28 of the shaft 20. The annular flange 40 and capture ring 46 are located at the body's oblique truncation and, therefore, the flange 40 and ring 46 are also at an oblique angle relative to the shaft 20. The flange 40 and the ring 46 act in concert to capture the ball 36 of the piston rod to prevent disengagement from the swash plate.

The swash plate 38 defines an arcuate slot 42 arranged annularly about the shaft 20 between the body 41 and the inner member 44. The size and shape of the slot 42 must be compatible with the size and shape of a fixedly-mounted torque reaction unit 80 so as to receive portions of the fixed torque reaction unit as the swash plate 38 rotates about it.

Figure 7:
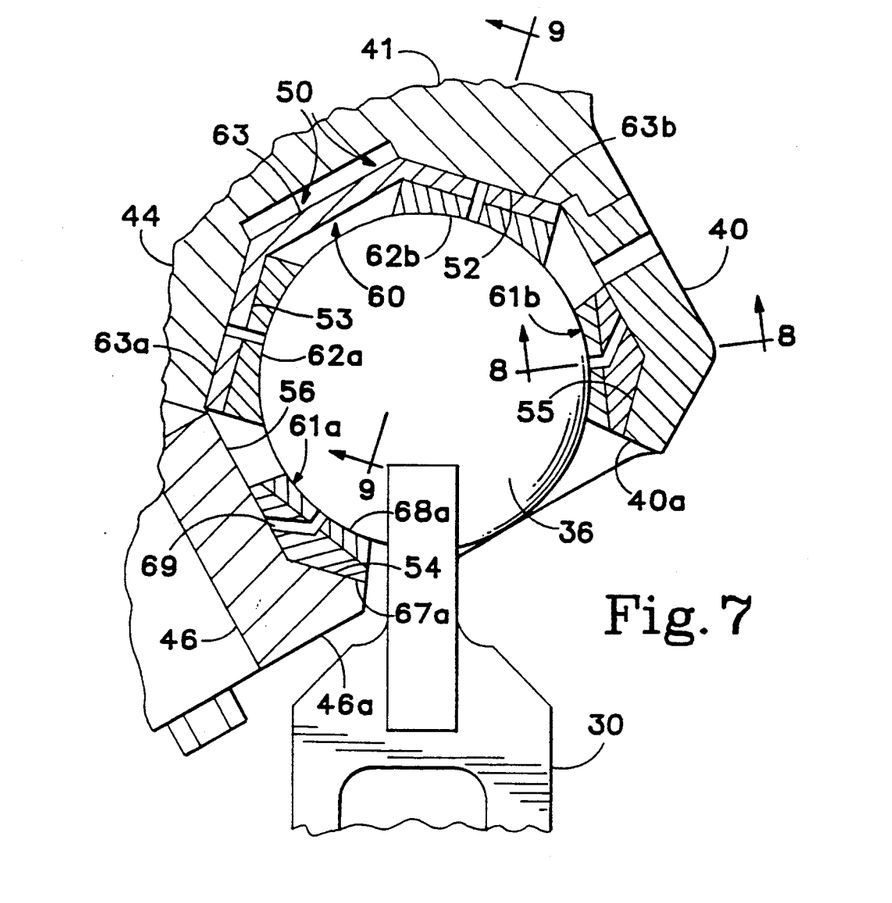
FIG. 7 is a detail view, at an enlarged scale, of one piston rod end and associated bearings of the engine of FIG. 3.
Figure 8:
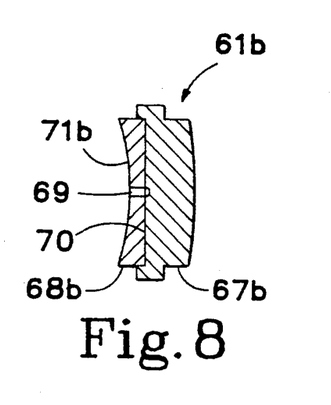
FIG. 8 is a sectional view of a secondary bearing taken along line 8—8 in FIG. 7.
Figure 9:
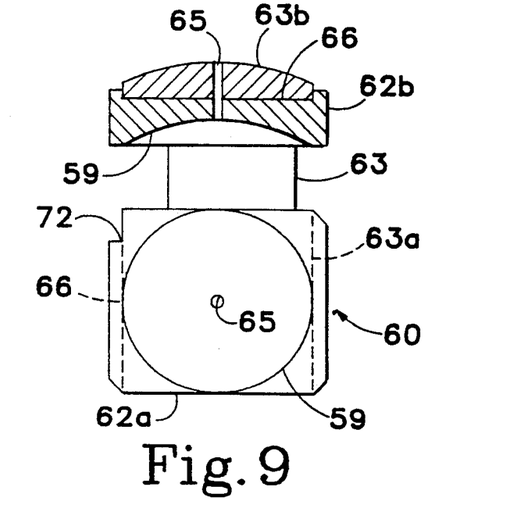
FIG. 9 is a sectional view of a primary bearing taken along line 9—9 in FIG. 7.

Turning now also to FIGS. 7, 8 and 9, the swash plate 38 also has a path 50 which is defined by two primary bearing runners 52 and 53 and two secondary bearing runners 54 and 55. A bearing runner is a smooth surface that extends circumferentially around the swash plate and upon which a bearing rides. The primary bearing runner 52 is formed on an inner surface of the swash plate body 41 and the primary bearing runner 53 is formed on an end face of the inner member 44. The secondary bearing runner 55 is formed on an inner, cylindrical surface of the annular flange 40 and a conical surface on a lip 40a, and the secondary bearing runner 54 is formed on an outer, cylindrical surface 56 of the capture ring 46 and a conical surface on a lip 46a. The primary bearing runners 52 and 53 are angularly arranged with respect to one another and receive substantially all of the forces associated with the power stroke of the piston. The secondary bearing runners 54 and 55 receive none of the forces associated with the power stroke but serve to prevent the ball 36 from disengaging from the path 50. It must be recalled that the swash plate 38 rotates while the piston rods reciprocate with their respective pistons. Thus, the balls 36 do not travel through the path 50, rather, the path moves past the balls 36 when the engine 10 is held stationary and the shaft 20 rotates.

The piston rod ball 36 is guided in the path 50 along the primary bearing runners 52 and 53 and the secondary bearing runners 54 and 55 by a plurality of bearings comprising a primary bearing 60 and secondary bearings 61a and 61b. Preferably, the primary bearing 60 comprises primary cup bearings 62a and 62b and a one-piece tie bar 63 which has slipper bearing portions 63a and 63b at its distal ends. The slipper bearing portions 63a and 63b of the tie bar 63 ride in slots 66 cut in the primary cup bearings 62a and 62b to keep 63a from separating from 62a and to keep 63b from separating from 62b. The slipper bearing portions 63a and 63b ride against the primary bearing runners 52 and 53 and the tie bar 63 prevents skewing of the slipper bearing portions 63a and 63b. The cup bearings 62a and 62b each have a spherical cavity 59 that form fits around a portion of the spherical ball 36. The primary bearings 60 are also provided with oil ducts 65 that allow lubricating oil to flow from the primary bearing runners 52 and 53 to the piston rod ball 36. A cutout 72 is provided to prevent interference of the bearing 60 with torque reaction member 82.

FIG. 8 shows cross-sectional detail of the secondary bearing 61b. Secondary bearing 61a is similar to 61b in all respects except for the shape of its exterior surfaces which are shaped to conform to a different portion of the path 50. The secondary bearings 61a and 61b are two-piece bearings comprising slotted slipper bearings 67a and 67b, respectively, and secondary cup bearings 68a and 68b, respectively. The cup bearings 68a and 68b ride in a slot 70 in the slotted slipper bearings 67a and 67b permitting the cup bearings to move freely in one dimension relative to the slipper bearings, but not allowing the slipper bearings to separate from the cup bearings. The cup bearings 68a and 68b each have a spherical cavity 71a and 71b that form fits around a portion of the spherical ball 36. Oil ducts 69 allow lubricating oil to flow through each secondary bearing from the surface of the respective bearing runner 54 and 55 to the piston rod ball 36.

Although not shown in the drawings, it is envisioned that alternative embodiments of the invention could have a greater or lesser number of bearings or the bearings could be configured differently. Accordingly, different bearings could be incorporated in the design and still be within the scope of the present invention. Also, a primary bearing runner could be comprised of a flat and a cylindrical surface instead of a conical surface.

Because the swash plate 38 is asymmetric with respect to the shaft 20, a dynamic pendulum counterbalance 64 is provided. The counterbalance 64 is properly positioned and weighted to counteract inertial forces of the pistons and piston rods, statically balance the swash plate, and control torsional vibration.

Figure 6:
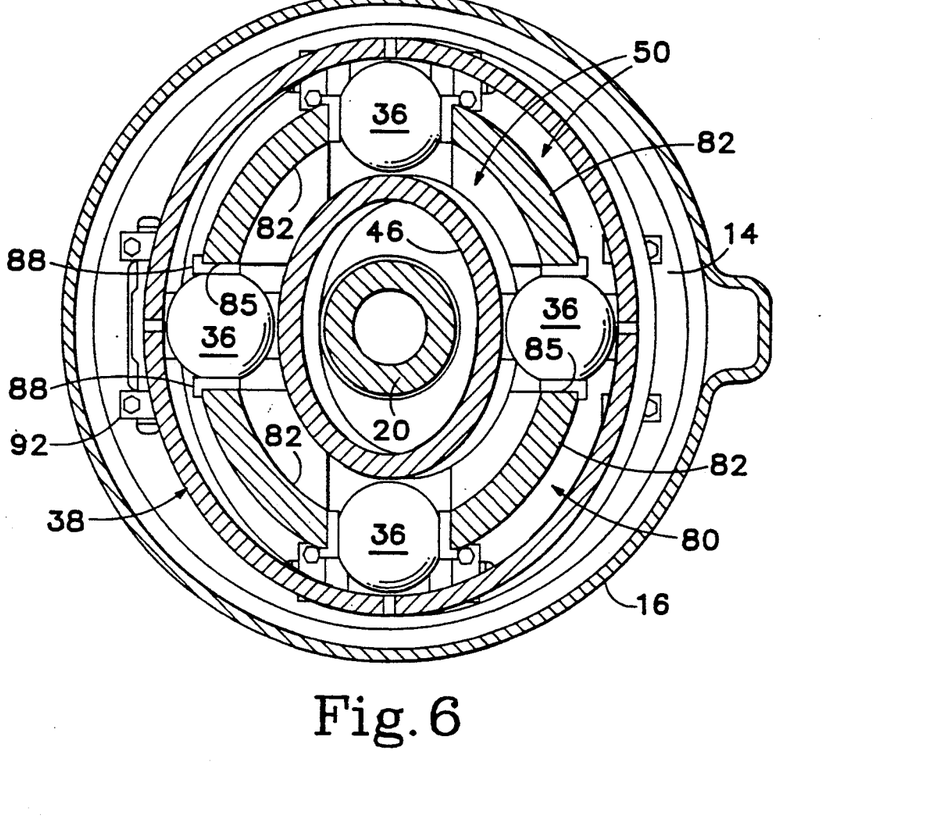
FIG. 6 is a sectional, partially cut-away view of the portion of the engine shown in FIG. 1, taken along line 6—6 of FIG. 4 and simplified by omission of some detail in order to show the relationship of the piston rods with the torque reaction unit.
Figure 10:
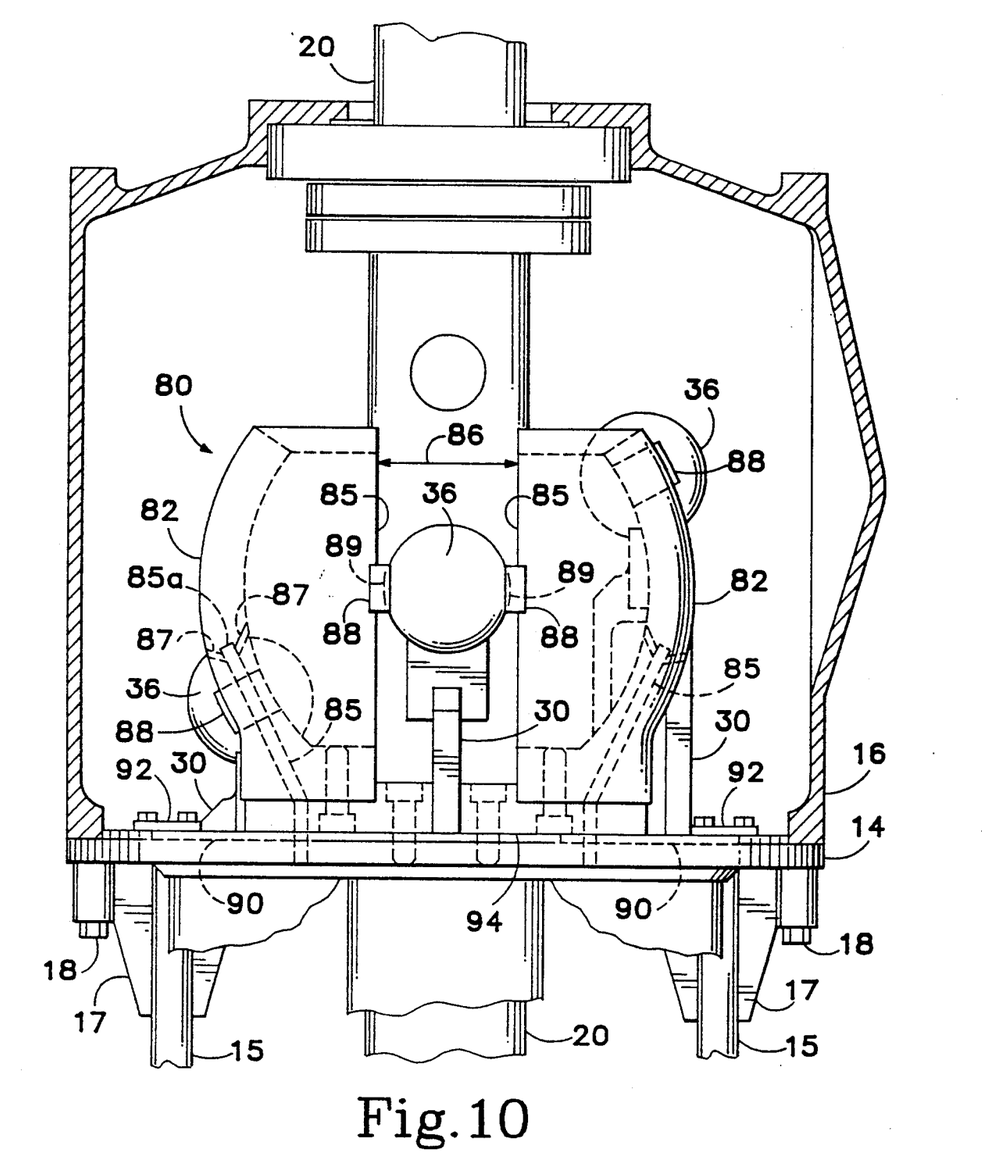
FIG. 10 is an elevational view of a portion of the engine shown in FIG. 1, taken in the same direction as FIG. 3 and showing the torque reaction unit and piston rods, but omitting the swash plate.

The multipiece torque reaction unit 80 is fixedly mounted to the bulkhead 14 and has a generally spherically-shaped outside surface. The torque reaction unit 80 consists of a base plate 94 and four similarly-shaped members 82 which are oriented and located with respect to each other to define a channel 86 between opposite planar faces 85 of adjacent members 82 as shown in FIGS. 6 and 10. The piston rod ball 36 moves within, and is guided by, the channel 86 as the respective piston 24 reciprocates in the respective cylinder 12. A pair of lipped slipper bearings 88 having concave surfaces 89 that conform to the surfaces of the balls 36 ride with the balls as they reciprocate. The lipped slipper bearings 88 transfer the circumferential loads from the balls 36 to the torque reaction unit members 82.

Each torque reaction member 82 is provided with an oil passage 85 extending through each member 82 from near the bulkhead 14 and terminating deep inside the respective member. At the terminus 85a of the passage 82 there are oil ducts 87 arranged to deliver oil from the terminus 85a to each of the two primary bearing runners 52 and 53.

As previously stated, the path 50 defines a plane that is oriented at the oblique angle $\phi$ relative to the longitudinal axis 28 and the piston path 26. As the piston rod 30 moves outward toward the swash plate 38 from the cylinder 12 it exerts pressure upon the bearing runners 52 and 53 of the path 50. Because the path 50 is oriented at an oblique angle, the force on the piston rod may be resolved into three components at the location of the ball 36: (1) an axial component along the piston path 26 that is parallel with the axis 28 of the shaft 20, (2) a radial component directed radially of the shaft 20; and (3) a circumferential component directed perpendicular to the axis 28 and spaced apart from it by the radius of the annular path 50, as projected onto a plane perpendicular to the axis 28 of the shaft 20.

The piston rod ball 36 is constrained against movement in the directions of the axial and radial components by surfaces of the path 50; namely bearing runners 52, 53, 54 and 55, but is not constrained circumferentially by any part of the swash plate. However, the ball 36 is prevented from moving circumferentially by the torque reaction unit 80 (acting through the lipped slipper bearings 88). Thus, the torque reaction unit 80 provides a reaction force countering the circumferential component of the swash plate 38 against the piston rod 30 thereby causing the swash plate to rotate as the piston 24 moves outward in the cylinder 12.

As rotation continues, the ball 36 reaches the part of the path 50 located axially furthest from the bulkhead 14; the path 50 of the swash plate 38 then forces the piston rod ball 36, and thus the piston, back toward the center of the cylinder 12. The torque reaction unit 80 also maintains proper orientation of the piston rod 30 with respect to its respective cylinder 12 and the swash plate 38 because the outer end of the piston rod 30 is constrained to movement along the channel 86.

Figure 4:
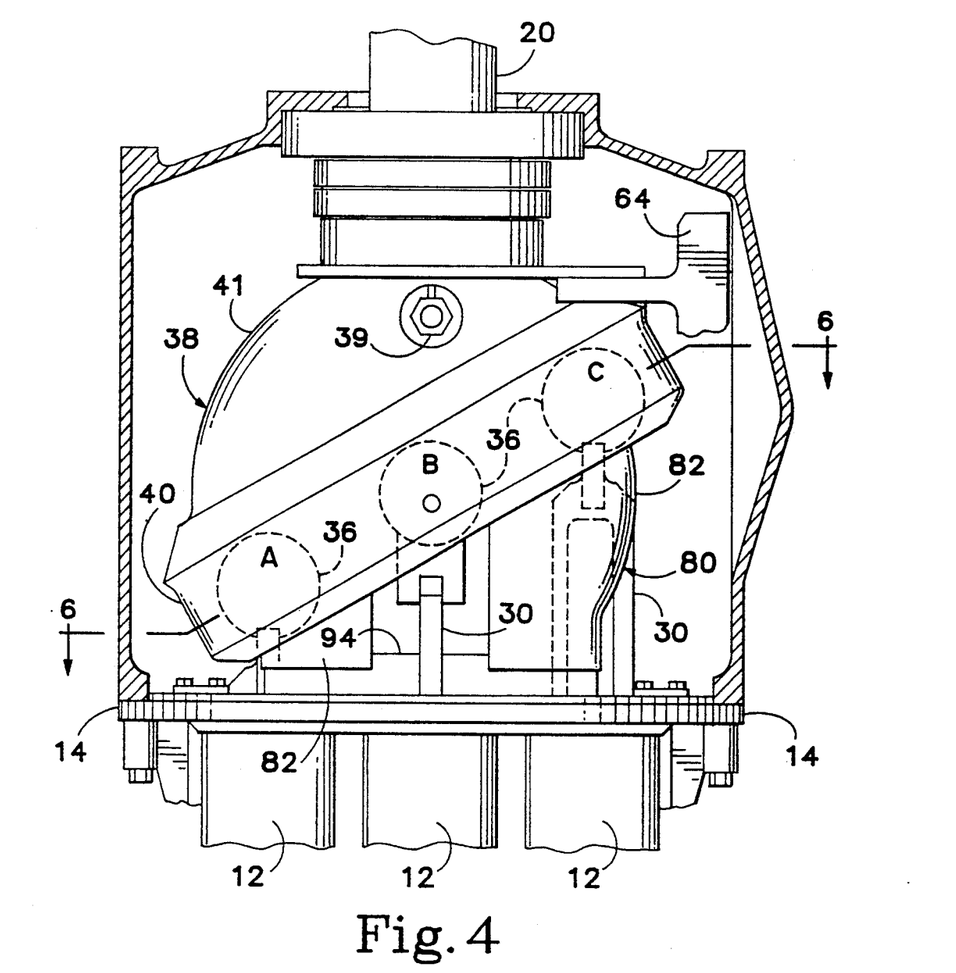
FIG. 4 is an elevational view of a portion of the engine shown in FIG. 1, taken in the same direction as FIG. 3 and showing the housing cut away to expose the swash plate and the torque reaction unit.

Viewing FIGS. 4 and 6 in combination it can be seen that when the pistons 24 and balls 36 are in positions shown at A and C, the balls 36 are closer to the shaft 20 than is the ball 36 in position B because the annular path 50 is circular, but tilted at the oblique angle $\phi$ relative to the shaft 20. For this reason the circular path 50 appears oval in the sectional view of FIG. 6. The angular relationship between the annular path 50 and the shaft 20 thus causes the balls 36 to move radially towards and away from the shaft 20 (in addition to the longitudinal, reciprocal movement) as the swash plate 38 rotates. Thus, the torque reaction unit 80 must be shaped to accommodate the radial motion of the piston rod balls 36 which accounts for the generally spherical shape of the unit 80.

In the preferred embodiment, the piston rod 30 and piston 24 are connected by the wrist pin 32 which permits the piston rod to rotate relative to the piston in only one plane. When the piston and piston rod are installed in a cylinder and the piston rod is connected to the swash plate 38 within the path 50, the plane in which the piston rod can rotate must be aligned along the radial direction because, as explained, the piston rod ball must move radially towards and away from the shaft as it reciprocates. Therefore, an anti-twist plate 90 (FIG. 2) is provided to maintain the proper orientation of the piston rod. As can be seen, the piston rod 30 is noncircular and the anti-twist plate 90 is provided with an opening that is compatible with the noncircular cross-section of the piston rod 30. The anti-twist plate 90 is disposed about the piston rod and mounted onto the bulkhead 14. The anti-twist plate 90 is recessed into the bulkhead 14 and held in place by a pair of bolted plates 92 which secure a distal end of the anti-twist plate 90. A proximal end of the anti-twist plate 90 is held in place by the torque reaction unit platform 94 that is bolted to the bulkhead 14, as can best be seen in FIG. 10. The anti-twist plate 90 is free to move laterally within the recess of the bulkhead to accommodate any slight lateral motion of the piston rod and to allow for dimensional tolerances.

The preferred embodiment of the present invention uses the multi-piece torque reaction unit 80 to facilitate assembly of the members 82 into the swash plate slot 42. Due to the close clearance between the swash plate and the torque reaction unit within the slot 42, the members 82 must be placed into position individually in respective locations before they can be bolted to the base plate 94. In particular rotational orientations the swash plate will envelope nearly the entire longitudinal length of member 82 and at other rotational orientations of the swash plate the member 82 will be completely exposed.

Figure 5:
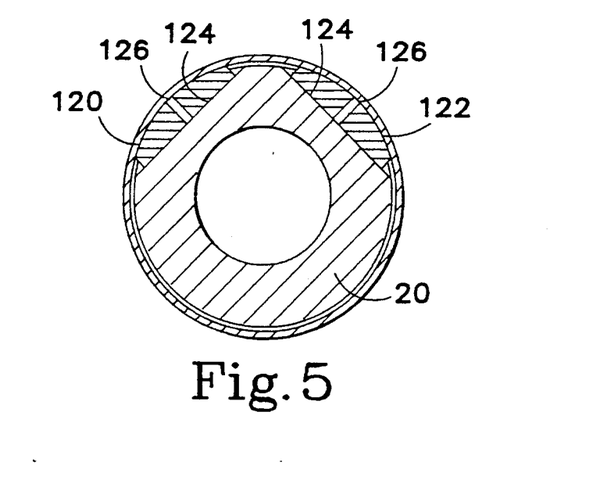
FIG. 5 is a sectional view of the shaft and shaft bearings associated with the engine of FIG. 1, taken along line 5—5 in FIG. 3.

With reference to FIG. 5, there are shown bearings 120 and 122 disposed about shaft 20 to control shaft deflection. Each bearing 120 and 122 is in a shape defined by perpendicular intersecting cylinders, one having a radius slightly greater than the radius of the shaft 20. To accommodate the bearings 120 and 122, a cylindrical cavity 124 is cut in the shaft 20 for each. Oil ducts 126 are provided for lubrication.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a swash-plate apparatus for converting reciprocal movement to rotational movement, the apparatus including a frame, a cylinder interconnected with said frame, a piston adapted for reciprocal movement within said cylinder, an elongate shaft rotatable about a longitudinal axis of rotation, a swash plate secured to said shaft for rotation therewith, and a piston rod extending between said piston and said swash plate, the improvement comprising at least one torque reaction member fixedly interconnected with said frame and in slidable contact with said piston rod.

2. The swash-plate apparatus of claim 1 wherein said apparatus further includes a plurality of cylinders and pistons and piston rods and the improvement further comprises a plurality of torque reaction members.

3. The swash-plate apparatus of claim 2 wherein the improvement further comprises pairs of adjacent torque reaction members that define a channel having opposing faces that maintain said piston rod in a predetermined orientation.

4. The swash-plate apparatus of claim 1 wherein said improvement further comprises bearing means disposed between said piston rod and said swash plate and between said piston rod and said torque reaction member for guiding a part of said piston rod therealong.

5. In a swash-plate apparatus for converting reciprocal movement to rotational movement, the apparatus including a frame, a cylinder interconnected with said frame, a piston adapted for reciprocal movement within said cylinder, an elongate shaft rotatable about a longitudinal axis of rotation, and a piston rod having a first end which is connected to said piston, the improvement comprising:
(a) a swash plate connected to said shaft for rotation therewith, said swash plate defining a cavity and a circumferential path extending about said shaft, a second end of said piston rod being slideably connected to said swash plate for movement along said path; and
(b) a torque reaction member for opposing a circumferential component of force of said swash plate against said second end of said piston rod, said torque reaction member being temporally disposed within said cavity such that it periodically passes inside and outside of said cavity as the swash plate rotates.

6. The swash-plate apparatus of claim 5, including the further improvement that the extent to which said torque reaction member is disposed within said cavity is a function of the rotational position of said swash plate.

7. The swash-plate apparatus of claim 5, wherein said apparatus includes a plurality of said cylinders, pistons, and piston rods and the improvement further comprises a plurality of torque reaction members.

8. The swash-plate apparatus of claim 7 wherein the improvement further comprises respective pairs of adjacent torque reaction members that define a channel having opposing faces that oppose said circumferential component of force.

9. The swash-plate apparatus of claim 5 wherein the improvement further comprises said torque reaction member being fixedly interconnected with said frame.

10. The swash-plate apparatus of claim 5 wherein the improvement further comprises that said circumferential path is defined by at least one circumferential bearing runner and said piston rod has ball means for slidably connecting said piston rod with said swash plate proximate said at least one bearing runner.

11. The swash-plate apparatus of claim 10 wherein the improvement further comprises bearings disposed between said piston rod ball means and said at least one bearing runner.

12. The swash-plate apparatus of claim 5 wherein the improvement further comprises bearings disposed between said piston rod and said torque reaction member and bearings disposed between said piston rod and said swash plate.

13. The swash-plate apparatus of claim 5 wherein said improvement further comprises:
(a) said swash plate having a body defining at least one bearing runner;
(b) capture means for connecting said second end of said piston rod to said swash plate, said capture means having at least one bearing runner and said capture means being joined to said swash plate body so that said bearing runners define said path; and
(c) said piston rod having ball means included at said second end for moving along said path proximate said bearing runners when said ball means is captured by said capture means.

14. The swash-plate apparatus of claim 13 wherein the improvement further comprises bearing means for maintaining said second end of said piston rod proximate said bearing runners and along said path.

15. The swash-plate apparatus of claim 13 wherein the improvement further comprises bearings between said piston rod and said torque reaction member.

16. The swash-plate apparatus of claim 5 wherein the improvement further comprises counterweight means for rotational stability of said shaft and said swash plate.

17. The swash-plate apparatus of claim 5 wherein the improvement further comprises that said cavity is an arcuate slot extending along at least a portion of said path.

18. A swash-plate apparatus for converting reciprocal linear movement to rotational movement, comprising:
(a) a frame;
(b) a cylinder interconnected with said frame;
(c) a piston adapted for reciprocal movement within said cylinder;
(d) an elongate shaft rotatable about a longitudinal axis of rotation;
(e) a swash plate defining a cavity and a circumferential path, said swash plate being connected to said shaft for rotation therewith;
(f) a piston rod having a first end connected to said piston and a second end slideably connected to said circumferential path; and
(g) a torque reaction member fixedly interconnected with said frame, said torque reaction member being disposed within said cavity during at least a part of the rotation of said swash plate.

* * * * *